United States Patent

[11] 3,632,361

[72] Inventor Orlando A. Battista
 Yardley, Pa.
[21] Appl. No. 836,998
[22] Filed June 26, 1969
[45] Patented Jan. 4, 1972
[73] Assignee FMC Corporation
 Philadelphia, Pa.
 Continuation-in-part of application Ser. No. 527,054, Feb. 14, 1966, now Patent No. 3,471,598, dated Oct. 7, 1969, which is a continuation-in-part of application Ser. No. 436,731, Mar. 1, 1965, now abandoned.
 This application June 26, 1969, Ser. No. 836,998

[54] WATER-INSOLUBLE MICROCRYSTALLINE COLLAGEN ABSORBENT MAT
 5 Claims, No Drawings
[52] U.S. Cl...................................................... 106/122, 106/124, 106/155, 106/161, 260/123.7
[51] Int. Cl......................................................... C08h 7/06
[50] Field of Search............................................ 99/176; 106/155, 161, 122; 260/123.7

[56] References Cited
UNITED STATES PATENTS

| 3,293,237 | 12/1966 | Wiegand .................... | 260/123.7 |
| 3,294,581 | 12/1966 | Hervey et al................. | 106/155 |
| 3,297,459 | 1/1967 | Veis et al...................... | 106/161 |

OTHER REFERENCES
The Condensed Chemical Dictionary, pp. 11 and 52, 1961

Primary Examiner—Theodore Morris
Attorneys—Thomas R. O'Malley and George F. Mueller ABSTRACT: A water-insoluble, highly absorbent body or mat of a partial salt of collagen (microcrystalline collagen) formed by preparing a dispersion of the salt of collagen in an aqueous medium, introducing the dispersion into a mold and freeze-drying the dispersion.

WATER-INSOLUBLE MICROCRYSTALLINE COLLAGEN ABSORBENT MAT

This application is a continuation-in-part of application Ser. No. 527,054, filed Feb. 14, 1966, now U.S. Pat. No. 3,471,598, dated Oct. 7, 1969, is a continuation-in-part of application Ser. No. 436,371, filed Mar. 1, 1965, now abandoned.

This invention relates to absorbent masses in the form of mats, sponges, and the like, which are characterized by extremely high absorbency along with excellent dry tensile strength and surprisingly high wet strength, which are particularly useful as absorbent materials in contact with the human skin. In particular, the invention relates to such mats when made from a new water-insoluble, microcrystalline colloidal form of collagen which, because it is water-insoluble even at a pH of 3-4, can be made into mats which are highly resistant to water without further treatment and which may be made extremely resistant to water on treatment with cross-linking agents.

Collagen is the principal building block of the hides and skins of most mammals, including man, and its principal source is hide substance. It also is the chief constituent of many other parts of mammals, such as tendons, intestinal walls, etc. In addition to its principal use—in the manufacture of leather—collagen is also widely used in the preparation of such materials as glue and gelatin. More recently, much study has been directed to the solubilization of collagen and its reconstitution from solution as fibers for use in sutures and fibrous mats for various purposes.

The elementary basic molecular unit of collagen is tropocollagen, sometimes called procollagen. This unit has been isolated and electron micrographs made, so that its structure is well understood. The macromolecules consist of three polypeptide chains coiled together in a long helix, about 10 to 15 angstrom units in diameter and about 3,000 angstrom units (0.3 micron) long. Tropocollagen is insoluble in neutral water, but is soluble in certain salt solutions and in dilute acid solutions having a pH of about 3. Much of the work done in the production of reconstituted collagen products has involved the conversion of fibrous collagen to acid-soluble tropocollagen usually employing relatively severe acid pretreatments whereby the collagen fibers and fibrils are reduced to tropocollagen molecules as above described followed by reprecipitation of the molecularly dispersed tropocollagen into a reconstituted form. A typical example of this procedure is disclosed in U.S. Pat. No. 3,157,524.

The next higher organized state in which collagen has heretofore been known is the collagen fibril, which consists of long, thin strands comprising thousands of individual tropocollagen units; the fibrils may be several hundred to a thousand angstrom units in diameter, and vary in length, generally being tens of microns long. In this form, the collagen is initially water-insoluble, not only at the neutral point but also in acidified water at a pH of 3. It is these fibrils which associate to form the macroscopic fibers present in natural substances and which fibers comprise many thousands of fibrils bonded together.

The art has long worked with these collagen fibers with the thought of using them for the formation of water-absorbent mats or sponges which could be used in contact with the human skin. Originally, what was attempted was the breaking down of the fibers of the hide into their individual molecular units by solubilizing them and then reconstituting them into batts. This process is extremely difficult and expensive, so that the batts could not possibly compete with the simple cellulosic batts commonly used for the purpose.

The second type of approach is disclosed in U.S. Pat. No. 3,157,524. This patent discloses that batts or sponges may be formed by freezing an acidified collagen gel comprising substantial amounts of tropocollagen, after which the water is sublimed under high vacuum while maintaining the temperature below the freezing point. The patent points out that such products redissolve in water and attempts to neutralize the acid in the freeze-dried product by aqueous alkaline solutions destroys the desired foamlike texture and produces a mat structure that loses much of its utility. The patentee overcomes this difficulty by freezing a gel of water-dispersible, acid treated collagen fibers, immersing the frozen mass in a circulating bath of a water-miscible solvent containing an alkaline agent to neutralize the acid whereby the collagen fibrils are dehydrated and coagulated and the salt formed by the neutralization is removed, and subsequently again drying the resultant collagen mass to form a spongelike mat which will resist dissolution in water.

The use of this method for neutralization is both slow and costly, and involves several processing steps which are expensive. Moreover, there is some loss of porosity in the sponges due to collapse in the organic solvent. Most importantly, the reconstituted collagen has lost its original morphology, and the natural bonds between the tropocollagen units present in the original fibrils are substantially weakened by the solubilization, regeneration and neutralization steps used.

In my copending application Ser. No. 436,371, filed Mar. 1, 1965, now abandoned, and replaced by copending application Ser. No. 586,969, filed Oct. 17, 1966, I have described a new form of microcrystalline collagen. The present application is directed specifically to the utilization of this new form of collagen in the production of water-soluble fibrous mats having remarkably high water-absorbency properties, without any need for neutralization of the constituent acid, the mats having outstanding softness, bulk and textures resembling human skin.

In accordance with this invention, I first produce my new form of collagen, which is a distinctly new physical state intermediate between that of swollen collagen fibers and of the tropocollagen molecules disclosed in the above patent. This new physical form of collagen is microcrystalline and colloidal; it consists of bundles of aggregated tropocollagen units which vary in length from that of an individual tropocollagen unit to just under 1 micron, and in diameter from about 25 angstrom units to some hundreds of angstrom units. Compositions comprising various forms of collagen, at least about 10 percent by weight of which comprises my new submicron microcrystalline colloidal collagen particles, and which are substantially free of tropocollagen and degraded derivatives thereof, produce viscosity stable aqueous gels at low concentrations, of the order of 1 percent.

When these microcrystalline colloidal collagen gels are freeze-dried, a mat is produced which is notable for its ability not to disintegrate in water, even after days of exposure, and for its high-absorptive capacity for water and other liquids. These spongelike mats still contain all of the very small amount of acid used in making the colloidal collagen; no neutralization whatsoever is made. This is possible because of the strict control of acid concentration in combination with appropriate mechanical disintegration to produce the microcrystalline, water-insoluble particles and to preclude true solution, in sharp contrast to products made in accordance with the above patent, where the collagen has been solubilized and reprecipitated. At this stage, the particles are completely undenatured, there has been a minimal disruption of the original lateral bonding forces between the tropocollagen units comprising the original fibrils and many of the original lateral natural bonding forces remain substantially unchanged.

In another aspect of this invention, small amounts of typical collagen cross-linking agents such as alum are incorporated in the mats, preferably being added prior to freezing, so as to impart substantial wet strength to the mats.

The microcrystalline colloidal collagen is prepared from any undenatured collagen in the natural state, either as pieces of original hide, gut, or other high-collagen source, but preferably with pieces dried under nondenaturing conditions and chopped up for easier handling. The undenatured collagen is treated under carefully controlled conditions with very dilute acid the pH of which is from about 1.6 to 2.6. Where the source material is wet, the proportion of water present must be taken into consideration in preparing the acid solution to be used in the treatment of the source material. The material is then mechanically disintegrated, in the presence of the dilute acid, until about 10 percent or more of the material is reduced to submicron size. It is not essential that all the source material be reduced to submicron size. The product becomes useful when about 10 percent has been so reduced, although optimum results are obtained at substantially higher concentrations of the submicron microcrystalline material.

For making microcrystalline colloidal collagen, one essential pretreatment is a thorough soaking of the hide substance or other collagen source material with the appropriate very dilute acid at the required pH.

With hydrochloric acid and a typical vacuum freeze-dried cowhide, it is essential that the pH of the treating solution not exceed about 2.6 to produce the microcrystalline colloidal collagen upon subsequent disintegration. Optimum results are attained with acid solutions having a pH of the order of 2 at 1 percent solids. Treatment with solutions having a pH of less than about 1.6 causes rapid degradation of molecular weight with an attendant buildup of acid-soluble tropocollagen and other degradation products as evidenced by a marked drop in apparent viscosity.

The action of the acid is three fold. First, the acid serves to cause a limited swelling of the fibers. Second, there is a limited hydrolysis of selective peptide linkages within the noncrystalline or amorphous regions of the collagen fibrils so that subsequent mechanical disintegration permits a ready fragmentation of the weakened morphology into microcrystalline particles having dimensions intermediate between those of tropocollagen and collagen fibrils. Third, a portion of the acid reacts with free primary amino groups of the collagen to form what may be termed collagen hydrochloride salt which, of course, is ionized in the presence of water.

More accurately, the microcrystalline collagen or the collagen salt is a partial salt of collagen because the acidic treatment is insufficient in severity to rupture completely all of the cross-linkages between the coiled polypeptide chains and to allow the acid to react with the internally bound amino groups within the tropocollagen molecules. The partial salt of collagen produced retains the morphology of the collagen fibrils and the subsequent mechanical attrition fractures the fibrils laterally. When the amino acid residues of bovine corium collagen, for example, are considered, 1 gram of collagen contains approximately 0.78 millimole of primary amino groups which could react with an added acid. In other words, when the acidic treatment is sufficiently severe to allow the acid to react with all amino groups, the resulting collagen salt would contain a stoichiometric bound acid content of about 0.78 millimole of acid per gram of collagen. The so-called microcrystalline collagen utilized in forming the products of the present invention exhibit a bound acid content varying from about 0.4 to about 0.7 millimole of acid per gram of collagen, or expressed in percentages, the bound acid content of the salt varies from about 50 percent to about 90 percent of the theoretical stoichiometric bound acid.

After the acid treatment, the hide substance, with the acid homogeneously distributed therethrough, is subjected to mechanical attrition to reduce at least about 10 percent of the product to submicron size. In general, the preferred disintegrating equipment subjects the particles of treated collagen to high shear against each other, such as the Waring Blender and the Cowles Dissolver for low solids concentration, causing disruption and effective reduction in size of the subfibril microcrystalline aggregates. High shear can be imparted in other ways, as by extrusion through small orifices as by the use of a Bauer Refiner and Rietz Extructor particularly in the case of high (above 5 percent) solids concentrations, or other known techniques.

Preferably, the disintegration is continued well beyond the point where 10 percent of the product is submicron, until 15 to 20 percent or even much more of this product has been reduced to colloidal size.

Hydrochloric acid has been referred to in the foregoing description and is also used in the examples merely because it is relatively inexpensive and allows ready flexibility and ease of control. Other acids, both inorganic and ionizable organic acids, such as, for example, sulfuric acid, hydrobromic acid, phosphoric acid, cyanoacetic acid, acetic acid and citric acid, are satisfactory. Sulfuric acid, for example, is satisfactory, but control of the action is difficult. Citric acid may be substituted for hydrochloric acid with about equal results. "Ease of control" has reference to the ability to arrest the swelling and hydrolysis of the collagen fibers at that point whereby the insoluble colloidal material is formed and is retained while preventing the rapid degradation of the material to a soluble product.

Upon completion of the disintegration, the gels produced have a pH of from about 2.6 to 3.8, the specific pH being dependent upon the pH of the treating acid. Preferably, the pH of the gels exhibiting optimum properties is between 3.0 and 3.3. For example, in the preparation of 1 percent gel, one part of finely ground, vacuum freeze-dried cowhide was treated with 100 parts of a hydrochloric acid solution having a pH of 2.25. After a 15-minute treating in a Waring Blender, the gel had a pH of 3.25. A 2 percent gel was prepared in like manner and has a pH of 3.3. When 1 gram samples of mats prepared by freeze-drying these gels were placed in 100 ml. of distilled water, the partial hydrochloride salt of collagen ionized without a disintegration of the mats and the pH of the water was lowered to a pH of 3.1.

The absorbent mats, sponges or other desired structural bodies are formed by freeze-drying the dispersion of gel preferably at temperatures of at least −5° to −10° C. and subliming the water by maintaining the frozen body under vacuum. Any conventional freeze-drying method and apparatus may be used. The gels may contain from about 0.25 percent up to 10 percent or more of the microcrystalline colloidal collagen and the porosity of the freeze-dried products will vary inversely with the solids content of the gel. It is preferred to use gels in the lower portion of the concentration range particularly where the product is to be utilized in contact with the human body. The gels may be partially air-dried prior to freeze-drying to reduce the drying cost, however, such procedure results in some loss in water absorptive capacity of the product. The gel may be spread in a freeze-drying tray to form a layer of the desired thickness or it may be poured into a desired mold form and then subjected to the freeze-drying step.

The products of this invention exhibit water absorption properties at least 3 times greater than surgical cotton, imbibing at least 50 times their own weight of water. These products to not disintegrate in water. For surgical purposes and as wound dressings, the products are superior to surgical cotton because they are lint-free. Typical products have dry tensile strengths of 28 p.s.i.

For many uses, it is highly desirable to remove as much of the free fatty material present in the microcrystalline collagen acid dispersions prior to freeze-drying them. This removal may be achieved by adding cellulosic fibers in the form of highly bleached kraft wood pulp or microcrystalline colloidal cellulose to the dispersion with appropriate mixing to distribute uniformly the cellulosic material throughout the dispersion. Subsequent filtration of the dispersions, as by a conventional pressure filtration method utilizing layers of cellulosic fabric, cotton batting and the like mounted between suitable foraminous metal plates, results in a significant removal of the natural fatty materials present in the raw material. Alternative procedures to reduce such fatty materials to minimal levels are to extract the raw undried hides with organic liquids such as acetone, that will dissolve fatty materials, or to force the dispersions through cellulose paper or fabric filters under very high pressures. Such filtration steps furthermore help to remove extraneous small amounts of other impurities such as chips of hair and fleshy tissues that are quite undesirable in the finished products.

The wet strength of the mats is quite low although the mats will not disintegrate when immersed in water and retained in the water for extended periods of time. Upon immersion in water, water is absorbed and the mat swells to some extent and then remains in this swollen condition. The tensile strength of the products, particularly the wet tensile strength, may be improved by incorporating in the gel prior to freeze-drying other fibers such as unswollen collagen hide fibers, cotton, rayon, nylon, polyesters, wool, carded freeze-dried collagen fibers, etc. The proportion of added fibers may be up to 25 percent or more based upon the weight of the microcrystalline collagen in the gel.

Greater improvements in the wet strength may be attained by incorporating in the gels cross-linking agents for collagen. These agents may be incorporated in the gel at any time prior to freeze-drying. However, it appears that a more homogeneous distribution throughout the product is obtained when these agents are added at the beginning of the attrition stage. Typical cross-linking agents which are satisfactory include the various formaldehyde-base precondensate and melamine-formaldehdye precondensate, formaldehyde, glyoxal, acetaldehyde, glutaraldehyde, potassium alum, chrome alum, iron alum, basic aluminum acetate, cadmium acetate, copper nitrate, barium hydroxide, water-soluble diisocyanates, etc. The specific cross-linking agent which is utilized will be dependent upon the end use of the products. Obviously, the cross-linking reactions may be accelerated by moderate heating prior to freeze-drying and this moderate heating is also advantageous where the higher concentrations of microcrystalline collagen are used in that the viscosity of the dispersion may be lowered to some extent. In no instance should temperatures greater than about 90° C. be employed. For medical and surgical uses, the innocuous cross-linking agents such as alums would be preferred.

By means of the cross-linking agents, wet strengths of up to 50 percent of the dry strengths are obtainable. An additional benefit is provided by the use of certain of the cross-linking agents, namely, an improvement of the heat resistance of the product. Shrinkage upon heating is substantially improved as is the resistance to discoloration when certain of the cross-linking agents are used. The improvement in the heat resistance both as to shrinkage and discoloration is particularly advantageous where it is desired to sterilize the mats or sponges.

The product may be used wherever absorptive material is desired, for example, in disposable diapers, sanitary napkins, and other catamenial devices, swabs, surgical sponges, industrial and domestic sponges, pads, applicators, tampons, surgical dressings, cigarette filters, and the like.

Typical examples of the invention are given here by way of illustration, and not by way of limitation.

EXAMPLE 1

Twenty grams of chopped-up cowhide, free of water by freeze-drying was placed in 1,980 ml. of a hydrochloric acid solution having a pH of 2 and treated at 25°–30° C. in a Cowless Dissolver, Model IVG, for 15 minutes at 5,400 r.p.m., using a 4-inch pick-blade. At the end of the attrition, the 1 percent gel of microcrystalline colloidal collagen was spread in a freeze-drying tray to form a layer one-eighth inch thick, and freeze-dried overnight (−40° to −50° C., vacuum 5 microns, heating cycle not exceeding 30° C. with condensation of sublimed water at 60° C.). The resultant product was a one-eighth inch mat which absorbed 65 times its own weight of water. The tensile strength of a dry test strip 1 inch in width was 3½ pounds, and the wet strength of a like test strip was quite low, but measurable. The product did not disintegrate on soaking in water.

EXAMPLES 2–7

Example 1 was repeated with the exception that various additions were made to the mixture at the beginning of the attrition. In example 2, there was added 1 gram of a melamine-formaldehyde condensate (percent based on the weight of the collagen) and a small amount of zinc chloride as accelerator. In example 3, the melamine-formaldehyde concentration was increased 2 grams; in example 4, to 4 grams; and in example 5, to 6 grams. In example 6, there was added one gram of polyester staple fiber (one-fourth inch lengths, 1½-denier per filament), based on the weight of the collagen. In example 7, the fiber was added along with 1 gram of melamine-formaldehyde condensate and zinc chloride.

Specimens of each of examples 1–7 were prepared measuring 4 inches, by 1 inch, by one-eighth, by cutting the mats parallel to the direction of gel spread in the freeze-drier tray. The tensile strength of the specimens was measured on an Instron tensile tester, applying the tensile force to the long dimension (crosshead speed 1 inch per minute). The wet tensile strength was then measured by first immersing the specimen for 2 minutes in water at 25° C. and testing immediately. The strengths are shown in table 1:

TABLE 1

| Example | % Cross-Linking Agent | Dry Tensile in lbs. | Wet Tensile in lbs. | Wet to Dry Tensile % |
| --- | --- | --- | --- | --- |
| 1 | 0 | 3.50 | 0.1 | — |
| 2 | 5 | 4.08 | 0.86 | 21.2 |
| 3 | 10 | 3.26 | 1.46 | 45.0 |
| 4 | 20 | 4.18 | 1.78 | 42.6 |
| 5 | 30 | 3.01 | 1.62 | 53.8 |
| 6* | 0 | 3.92 | 0.22 | 5.7 |
| 7* | 5 | 4.18 | 0.81 | 19.3 |

*Including 5% polyester fiber

The strength exhibited by the product of example 1 is equivalent to a dry tensile strength of about 28 p.s.i. It will be noted that the addition of cross-linking agents does not affect the dry strength in any notable fashion, the differences probably being due to experimental error inherent in the test procedure as between the different specimens. However, it will be noted that the relationship of wet tensile to dry tensile levels out at just about 10 percent of cross-linking agent, and that the addition of reinforcing fiber increases the tensile slightly.

The water inhibition of the products in grams of water per gram of microcrystalline collagen is shown in the following table 2, and indicates that there is a slight decrease in the water absorption with cross-linking, but it is negligible in view of the large increase in wet strength.

TABLE 2

| Example | Imbibition of g.H₂O/g. material |
| --- | --- |
| 1 | 64.7 |
| 2 | 56.5 |
| 3 | 55.7 |
| 4 | 55.7 |
| 5 | 49.9 |
| 6 | 66.9 |
| 7 | 51.8 |
| Surgical cotton | 17.8 |

EXAMPLE 8

Mats made from three-fourths percent gels of microcrystalline colloidal collagen were prepared in accordance with the method of the foregoing examples, except that there was included in the different mats a variety of cross-linking agents. In each instance, 0.001 mole of the cross-linking agent was added per 100 grams of gel. Mats containing potassium alum, melamine-formaldehyde condensate, basic aluminum acetate, cadmium acetate, chrome alum, copper nitrate, and barium hydroxide were prepared and compared with a similar untreated mat.

Measurements were made of the shrinkage of the mats on heating. Specimens were heated in an oven from 25° C. to 200° C. by 10° or 25° intervals, the specimens being retained in the oven for 1 hour at each temperature. All of the specimens showed a shrinkage not exceeding about 2.5 percent up to 100° C. and a shrinkage not exceeding 5 percent up to about 140° C. The control mat and the mat containing melamine-formaldehyde showed an increasing shrinkage which amounted to about 10 percent at 175° C. and rose to 35 percent at 200° C. The mat containing copper nitrate had a 10 percent shrinkage at about 160° C. and a 26 percent shrinkage at 200° C. The cadmium acetate containing mat had a shrinkage of about 10 percent at 180° C. and a shrinkage of about 20 percent at 200° C. The potassium alum and the aluminum acetate containing mats had a shrinkage of about 5 percent at 150° C. and a shrinkage of 10 percent at 200° C. The chrome alum mat had a shrinkage of 5 percent at 170° C. an a shrinkage of 9 percent at 200° C. The barium hydroxide containing mat had a 5 percent shrinkage at 180° C. and a shrinkage of 10 percent at 200° C.

Heating of the mats also showed that no visible deterioration or change of color was noticeable at temperatures up to 100° C. Most of the mats began to exhibit a slight discoloration at 120° C. and the discoloration increased as the temperature increased. However, the mat prepared from the gel containing potassium alum showed no visible color change at 200° C. and remained white in color.

The heat stability of the products is particularly advantageous where it is desired to sterilize the products or when they are to be used in high-temperature applications. In such instances, the cross-linking agent may be selected based upon its action on both the shrinkage and discoloration characteristics.

Where higher strength mats are required, gels are used having higher concentrations of the microcrystalline collagen because the strength of the products varies directly with the concentration of the gels. The water absorption of the products, however, varies inversely with the concentration of the gels and, accordingly, for specific applications, it is necessary to take both properties into consideration in the preparation of the original gel.

Obviously, the examples can be multiplied indefinitely without departing from the scope of the invention.

I claim:

1. A water-insoluble, porous, spongelike body comprising a water-insoluble, ionizable, partial salt of collagen having a bound acid content of from about 50 percent to about 90 percent of the theoretical stoichiometric bound acid content and being essentially free of tropocollagen and degraded derivatives thereof, the partial salt of collagen being further characterized in that when colloidally dispersed in water to form a one-half percent by weight gel wherein at least 10 percent by weight of the partial salt has a particle size under 1 micron, the gel exhibits a pH of about 3.2±0.2, and the spongelike body being further characterized in imbibing at least 50 times its own weight of water and in swelling without disintegrating when immersed in water.

2. A water-insoluble, porous, spongelike body as defined in claim 1 wherein the ionizable, partial salt of collagen is a hydrogen chloride salt.

3. A water-insoluble, porous, spongelike body as defined in claim 1 wherein the partial salt of collagen is cross-linked and the spongelike body is further characterized in exhibiting a shrinkage of not more than about 26 percent when heated to 200° C.

4. A water-insoluble, porous, spongelike body as defined in claim 1 containing reinforcing fibers distributed uniformly throughout the body.

5. A water-insoluble, porous, spongelike body as defined in claim 1 containing reinforcing fibers in an amount up to about 25 percent by weight distributed uniformly throughout the body, the fibers being selected from the group consisting of unswollen collagen hide fibers, carded freeze-dried collagen fibers, cotton, rayon and wool.

* * * * *

UNITED STATES PATENT OFFICE
CERTIFICATE OF CORRECTION

Patent No. 3,632,361          Dated January 4, 1972

Inventor(s) Orlando A. Battista

It is certified that error appears in the above-identified patent and that said Letters Patent are hereby corrected as shown below:

Column 1, line 5 "is" should read --which is--.

Column 4, line 31 "of" should read --or--.

Column 5, line 21 "formaldehyde-base precondensate" should read --formaldehyde-base cross-linking agents such as, for example, urea-formaldehyde precondensate--.

Column 6, line 13 "one-eighth" should read --one-eighth inch--.

Column 7, line 26 "an" should read --and--.

Signed and sealed this 1st day of May 1973.

(SEAL)
Attest:

EDWARD M. FLETCHER, JR.      ROBERT GOTTSCHALK
Attesting Officer               Commissioner of Patents